(No Model.)
A. HUDSON.
TOBACCO MOISTENER.
No. 531,725. Patented Jan. 1, 1895.
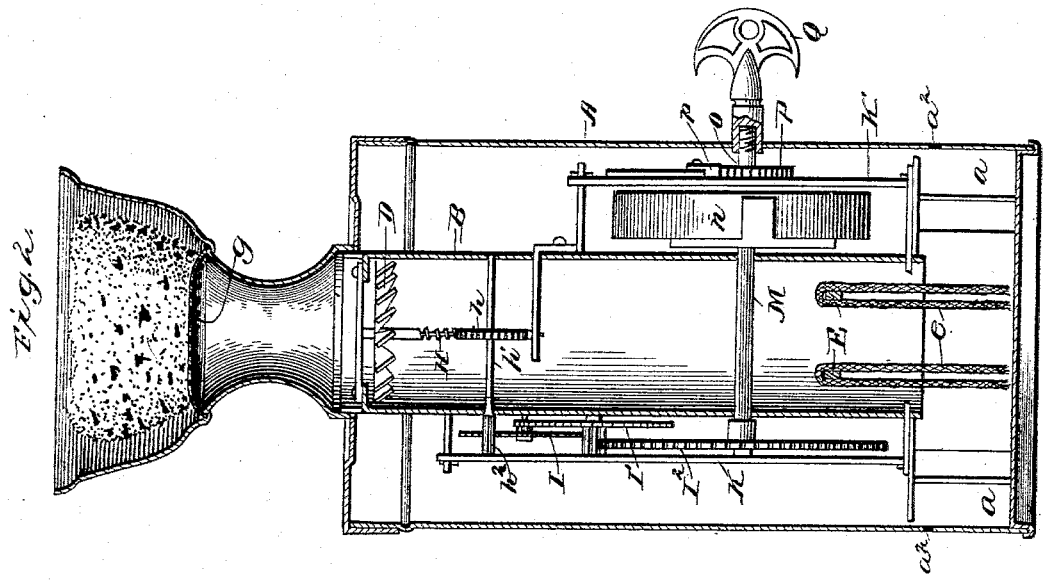
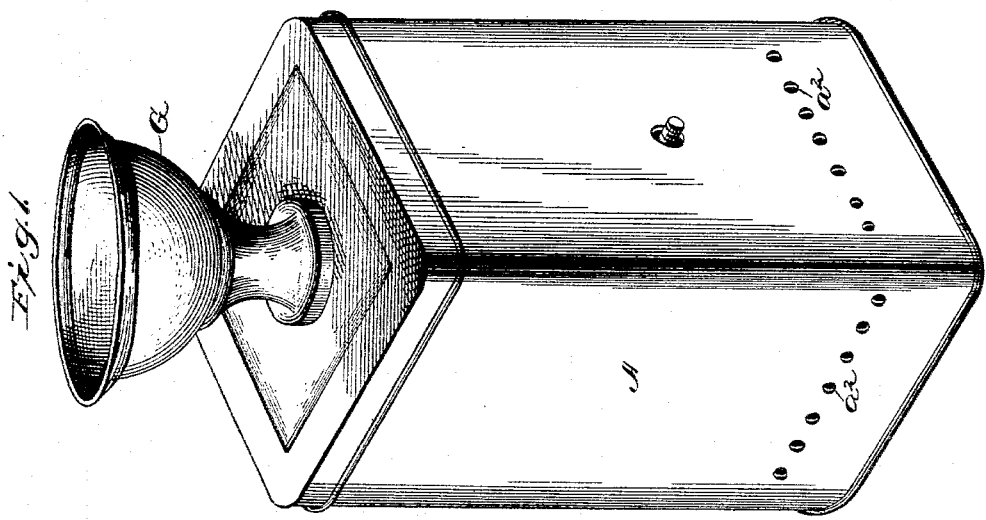
Witnesses
J. M. Fowler Jr.
Alex Stewart.
Inventor
Arthur Hudson,
By Church & Church,
his Attorneys

UNITED STATES PATENT OFFICE.

ARTHUR HUDSON, OF NEWTON, MASSACHUSETTS, ASSIGNOR OF ONE-HALF TO CHARLES E. WHITMORE, OF SAME PLACE.

TOBACCO-MOISTENER.

SPECIFICATION forming part of Letters Patent No. 531,725, dated January 1, 1895.

Application filed May 19, 1893. Serial No. 474,780. (No model.)

*To all whom it may concern:*

Be it known that I, ARTHUR HUDSON, of Newton, in the county of Middlesex and State of Massachusetts, have invented certain new and useful Improvements in Tobacco-Moisteners; and I do hereby declare the following to be a full, clear, and exact description of the same, reference being had to the accompanying drawings, forming a part of this specification, and to the letters of reference marked thereon.

This invention relates to improvements in devices for use in moistening tobacco, cigars, &c., in boxes, show cases and the like, although not exclusively applicable to such uses as will be apparent from the following description and claims.

The invention has for its object to provide a device which will disseminate moisture at a predetermined rate, irrespective of the external conditions existing at the time, and which usually cause such wide fluctuations in the quantity of moisture evaporated from an ordinary moistening apparatus.

With this object in view the invention consists broadly of a casing having a tank or receptacle in the bottom for the reception of the liquid to be evaporated, an air duct leading from said receptacle to the top of the casing and a mechanically driven fan located in said duct, whereby a steady, uniform and constant current of moistened air is kept flowing from the device all the while, and further the invention consists in certain novel details of construction and combinations and arrangements of parts all as will be hereinafter described and pointed out particularly in the appended claims.

Referring to the accompanying drawings: Figure 1 is a perspective view of a device constructed in accordance with my present invention. Fig. 2 is a vertical section through the casing with portions of the duct broken away to illustrate the internal structure.

Like letters of reference in both figures indicate the same parts.

In carrying the present invention into practice in the most approved form, I provide a casing A of convenient shape. Within this casing is arranged a central vertical duct B, provided or formed with an extended base C, which just fits within the casing A, said base being mounted upon legs or supports $a$, which elevate the base and duct from the bottom of the casing. Thus a compartment or chamber is formed between the base C and the bottom of the casing for the liquid, to be evaporated; or a separate water receptacle may be provided if desired. A series of apertures or ducts $a^2$ is formed in the casing for the introduction of air to be carried over the evaporating surface and discharged into the compartments. By simply removing the top of the casing the duct, with its base and attached mechanism, to be presently described, can be readily withdrawn from the casing. This central duct is preferably cylindrical throughout its length and at the upper end supports, in suitable bearings a horizontal blower or fan D, which is driven from mechanism to be presently described, at a practically constant speed and causes a constant and uniform flow of air through the duct and over the evaporating surface of the water chamber below. To increase this evaporating surface, cross bars E are arranged within the duct and support any desired number of wicks $e$ which dipping in the liquid or water at the lower end and acting in accordance with the well known laws of capillarity draw the liquid or water up and expose a relatively large surface to the action of the current of air passing through the duct, thus making it possible to regulate the quantity of moisture given off by the apparatus with the greatest nicety, for by varying the number and size of the wicks, the area of the evaporating surface may be readily varied to suit the requirements of any particular case or condition.

The top of the case is preferably closed by a cover and to further increase the efficiency of the device, it is provided with a central opening for the duct, over which opening a cup shaped receptacle G having a foraminous bottom $g$ is adapted to be placed. Within this cup or receptacle a sponge or equivalent absorbent may be placed and the air passing through the duct is thereby further moistened and strained before it is discharged into the compartment.

In practice, it is found that a steady and not too powerful rotation of the fan or blower for a long period sets up a flow of air which being carried over the evaporating surface and through the strainer is kept constantly moistened and by maintaining the circulation in the compartment keeps the air at a uniform humidity which could not be maintained without the maintenance of an artificial circulation of the air.

As the most convenient means for driving the blower and maintaining its rotation for a long period without attention I prefer to employ a mechanical spring motor for which purpose the shaft of the blower or fan is formed into a screw or spiral H with which a gear or worm wheel $h$ mounted on a horizontal shaft $h'$ passing to the outside of the duct is adapted to mesh. On the outer end of this shaft $h'$ is formed a pinion $h^2$ meshing with a large gear I forming the last gear of a train of gears I, I', I$^2$, all having journals in a frame plate K rigidly supported at one side of the central duct. The last or master wheel I$^2$ is provided with a shaft M passing away through the central duct and carrying at the farther end a frame $n$ to which the outer end of the motor spring N is secured in the ordinary manner. The inner end of the spring is attached to an arbor O passing through a second frame plate K' arranged diametrically opposite to the frame plate K and provided on the outer side of said plate with a ratchet wheel P and a key extension or threaded portion for the reception of a key Q.

A pawl $p$ on the frame plate K' serves to prevent the retrograde movement of the arbor and hence causes the spring to exert its power in turning the shaft of the master wheel of the train, which power is transmitted through the train of gearing to the worm shaft and rotates the fan at a constant and uniform speed as aforesaid.

Of course the spring and train of gearing may be arranged to drive the fan or blower, for any reasonable period of time, but in practice, where the device is intended for show-cases, &c., it will only be found necessary to have the device driven for a few hours at a time, say six or eight, in order to answer all requirements.

The parts of the device are separable. The central duct and its extended base or platform are removable and the latter serves to divide the casing into two compartments and compels the air drawn through the central duct to pass in through the openings $a^2$ and over the evaporating surface. When the cover is placed in position the mouth of the central duct projects through the opening therein and if the cup-shaped receptacle is employed it is put in place over the mouth of the central duct.

In use, the liquid is supplied to the chamber or tank, the motor spring wound and the device placed in the case or compartment wherein the air is to be humidified and allowed to to run as long as desired.

Obviously the device may be employed to disseminate perfumery throughout a compartment and the shape and character of the inclosing casing and fan or blower may be changed or modified to suit the requirements of any particular use to which the device is put and hence I do not wish to be limited to the particular structure shown.

Having thus described my invention, what I claim as new is—

1. In a portable humidifier, the combination with the casing having the water chamber at the bottom and the vertical air duct leading from the tank or chamber through the top of the casing, of the fan or blower in the top of the duct and the motor mechanism for driving the fan to create a draft over the evaporating surface of the chamber and into the compartments; substantially as described.

2. In a humidifier, such as described, the combination with the casing having the water chamber, the duct having the extended base mounted on legs or supports and forming the top of said chamber and the fan or blower journaled to rotate in the duct, of the motor mechanism for the fan carried by the duct and base whereby they may be removed from the casing, substantially as described.

3. In a humidifier, such as described, the combination with the casing having the water chamber, the duct having the extended base fitting within the casing and forming the top of the water chamber and the fan or blower journaled to rotate in the duct, of the train of gearing carried on the outside of the duct and the spring for moving said gearing to rotate the fan or blower, substantially as described.

4. In a humidifier, the combination with the casing having the water chamber at the bottom, the duct leading up from said chamber and the fan or blower journaled to rotate in said duct, of the cup shaped receptacle located over the duct and having the foraminous bottom; substantially as described.

5. In a humidifier, the combination with the casing having the water chamber, with lateral intake openings above the same, the duct having the extended base supported above the intake openings and the fan or blower in the upper end of the duct, of the motor mechanism for the fan carried by the duct and base within the casing; substantially as described.

6. In a humidifier, the combination with the casing having the water chamber at the bottom with lateral intake openings above the same, the top having the central opening and the receptacle with the foraminous opening fitting over said opening of the duct leading from the tank to the central opening in the top, the fan or blower located in the upper end of the duct, wicks suspended in the lower end of the duct and dipping into the chamber and a motor mechanism for the fan or blower, substantially as described.

ARTHUR HUDSON.

Witnesses:
FRANK L. PAGE,
J. J. GORDEN.